PHOTO ELECTRIC CARD READING SYSTEM

Filed June 2, 1961 2 Sheets-Sheet 1

INVENTOR.
EUGENE E. PAANANEN.
BY Harry R. Jumont
ATTORNEY

Dec. 17, 1963 E. E. PAANANEN 3,114,841

PHOTO ELECTRIC CARD READING SYSTEM

Filed June 2, 1961 2 Sheets-Sheet 2

INVENTOR.
EUGENE E. PAANANEN.
BY Harry R. Dumont
ATTORNEY

United States Patent Office 3,114,841
Patented Dec. 17, 1963

3,114,841

PHOTO ELECTRIC CARD READING SYSTEM

Eugene E. Paananen, Livonia, Mich., assignor to Burroughs Corporation, Detroit, Mich., a corporation of Michigan Filed June 2, 1961, Ser. No. 114,546
14 Claims. (Cl. 250—219)

This invention relates generally to photoelectric devices and, more particularly, to a photoelectric system for a card reader.

It is an object of this invention to provide a new and improved method and apparatus for detecting the advancement of a record card through a predetermined distance.

It is a further object of this invention to provide an improved photoelectric card reading system operable without an external voltage supply.

It is a still further object of this invention to provide an improved photoelectric card reading system where uniformity of output pulses derived from the leading edge of a card advanced is maintainable at a maximum.

The foregoing and other objects of this invention will become apparent upon consideration of the following description, taken together with the accompanying drawings, in which.

Figure 1:
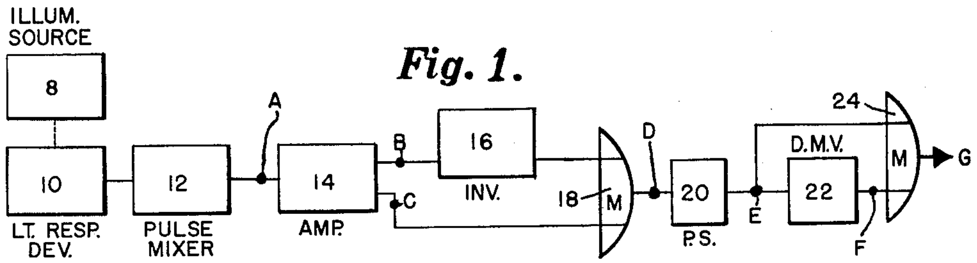
FIG. 1 is a block diagram of a clock system for a card reader in which the present invention is incorporated.

Shown in FIG. 1 is a block diagram of the clock system, which is used in connection with a photoelectric card reader which forms the subject matter of the present invention. During the advancement of a card past the assembly of photo-responsive elements, the leading edge of the card produces a number of pulses equal in number to the number of equally spaced vertical data indicia columns in the card. The clock system must thus provide, for example, eighty light pulses for an eighty column card, to provide a checking function and insure that data in each column has been read. The clocking system includes the source of illumination 8, photoelectric reader assembly 10, pulse mixer 12, amplifier 14, inverter 16, mixer 18, standardizer 20, delay multivibrator 22 and mixer 24.

Figure 2:
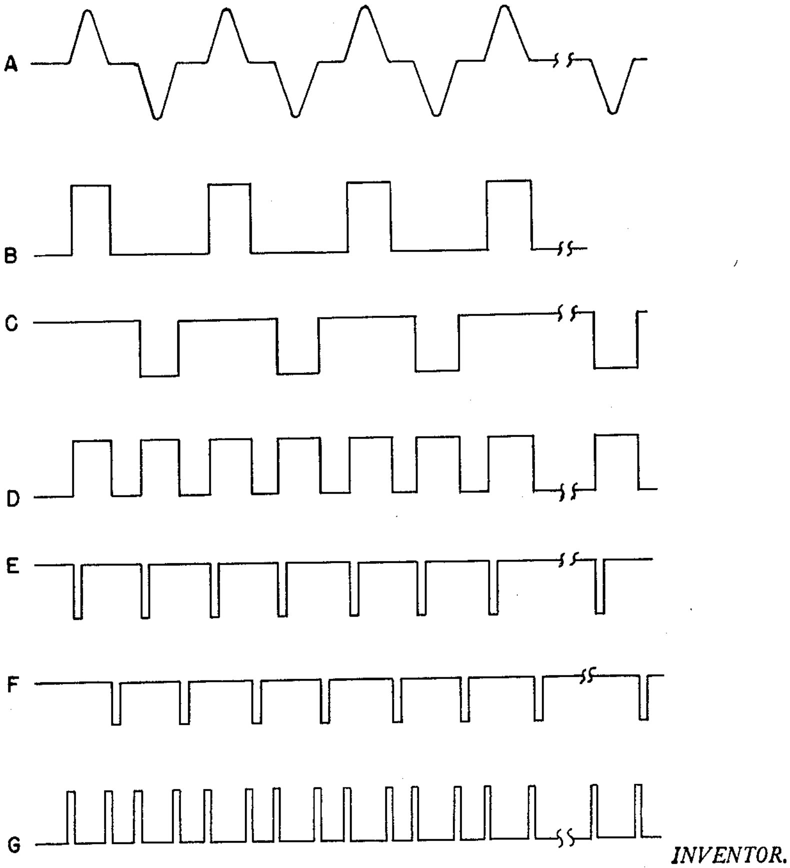
FIG. 2 is a drawing showing voltage wave forms at designated points in the clock system.

FIG. 2 shows the wave forms at selected points of interest in the clock system. At point A the pulse output from the pulse mixer 12 is shown to be alternating pulses of opposite polarity which total forty for each card. Amplifier 14 is a standard transistor amplifier which produces an amplified positive and negative pulse output at points B and C, respectively. The inverter 16 reverses the polarity of the intervening negative going pulses so that the output of mixer 18 at D is a continuous pulse train of positive pulses. The output at point E from pulse standardizer 20 is a train of forty uniform width pulses. The delay multivibrator 22 is employed to produce an additional forty pulses at F which when added to the original forty pulses from E in mixer 24 produce the required eighty pulse train for each card at G. A transistorized form of delay multivibrator is illustrated in FIG. 4B of copending U.S. patent application S.N. 861,963, filed December 24, 1959, in which a suitable form of pulse standardizer is illustrated at 341.

Figure 3:
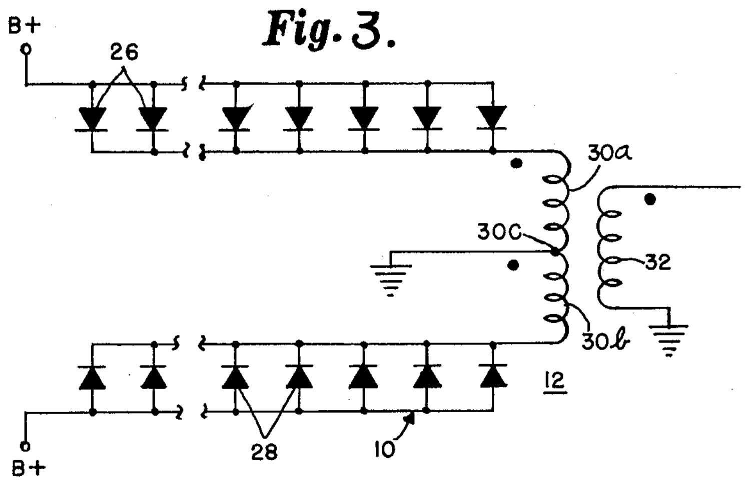
FIG. 3 is a schematic of the pulse mixer circuit in which photo diodes are used as the input means.

FIG. 3 illustrates the organization of the elements of reading assembly 10 and pulse mixer 12. The reading assembly is subjected to a constant source of illumination 8 in a manner which will be shown more clearly in connection with FIG. 5*a*. A plurality of photo diodes totaling forty in number are utilized. The photo diodes 26 and 28 are matched to have substantially equal light sensitivity characteristics. The tweny diodes 26 in the upper group correspond to alternate odd number columns, i.e 1, 5, 9 . . ., on the card and are connected across inductance 30*a*. The twenty diodes 28 in the lower group correspond to alternate intervening odd number columns, i.e. 3, 7, 11 . . ., in the card and are connected across inductance 30*b*. A source of D.C. voltage of the order of 15 volts is applied through the photo diodes to each input inductance winding. The photo diodes 26 and 28 may be of the germanium type, which, when incorporated in a D.C. circuit, will cause a small current to flow in the absence of light and will conduct an appreciable larger current flow in the presence of light. Thus, in the present embodiment, the leading edge of the card will successively darken alternate photo diodes and thus alternately decrease the D.C. current in the input inductances 30*a* and 30*b*. In a manner indicated by conventional polarity markings to be series subtractive, the inductances 30*a* and 30*b* are connected to a common point 30*c*. Input inductances 30*a*, 30*b* and output inductance 32 have an equal number of turns. With all photo diodes illuminated, the circuit is in a quiescent state. The D.C. output from photo diodes 26 is producing a flux in inductance 30*a* in opposition to and equal to the flux produced by the D.C. output from photo diodes 28 in inductance winding 30*b*. Because of the balanced or flux cancelling condition, no output will be transmitted from either input inductance to the output inductance 32. As soon as the first photo diode 26 is covered by the leading edge of the card, a decrease in D.C. current and a change in flux about inductance 30*a* causes an output pulse in inductance 32. As the card covers the next diode 28, the D.C. current in inductance 30*b* drops and an output pulse of the opposite polarity is produced in inductance 32. The D.C. currents and the flux in the input inductances 30*a* and 30*b* become equal again until the next odd numbered photo diode is covered. Because the pulses are differentiated across the input inductances, the resultant high peaked pulses cause an output at A of FIG. 2 of forty spaced and distinctly separated pulses. Each output pulse generated in winding 32 is proportional to the current drop in a single photo diode and no individual D.C. amplifiers are needed. The gain of the amplifier 14 can be adjusted to produce a pulse from the weakest cell with little effect on the width of the pulses resulting from the strongest cell output.

Figure 4:
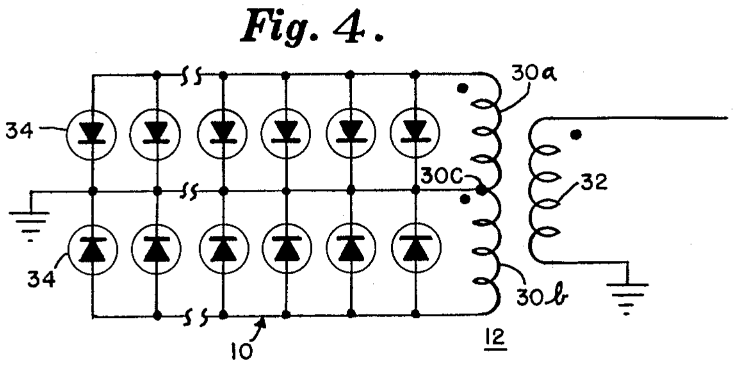
FIG. 4 is a schematic showing an alternate embodiment of the pulse mixer circuit in which photo voltaic or solar cells are utilized as the input means.

FIG. 4 shows an alternate embodiment of the present invention which makes use of a plurality of photo voltaic or solar cells 34 in place of the photo diodes in FIG. 3. The solar cells differ from photo diodes in that they do not require any external bias. A solar cell of a type known in the art and commercially available from the Hoffman Electronics Corporation includes a single crystal N-type silicon with a P-type layer diffused into its surface. It is the P-type layer which is the light sensitive surface of the cell. The crystal generates its own electrical current output at a relatively constant level when illuminated with a constant light energy. Since the photo current varies with the intensity of illumination, the operation of the circuit in FIG. 4 will be substantially the same as that described for the circuit for FIG. 3. The leading edge of the card alternately covers photo voltaic cells 34 in the upper and lower groups. Thus the output from output inductance 32 will result from successive changes in D.C. current and flux in input inductances 30a and 30b.

Figures 5, 5A:
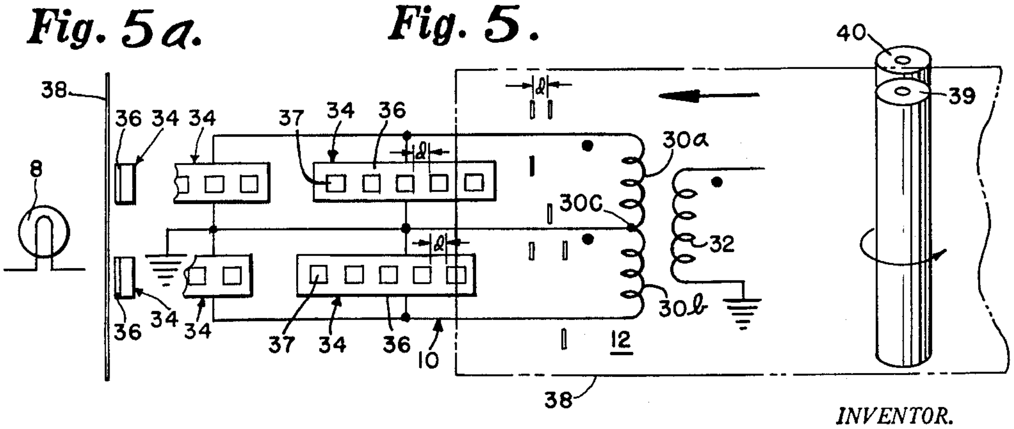
FIG. 5 is a combined diagrammatic and schematic drawing of the pulse mixer circuit and cell reading assembly.
FIG. 5*a* is a right side elevation of the cell reading assembly of FIG. 5.

FIGS. 5 and 5a show a physical modification of the reading cell assembly 10 over that described in connection with FIG. 4. A plurality of photo voltaic or solar cells 34 of the larger size type commercially available are used in place of the forty individual solar cells of FIG. 4. Each solar cell 34 is covered on its light sensitive surface with a masking means such as masking plate 36 or the like to leave five apertures 37 available to receive illumination from source of illumination 8. Apertures 37 are equally spaced along the linear path of movement of the sheet 38. Thus, each solar cell can serve the function in the present reading assembly and mixer circuit of five individual solar cells. The uniformity of sixteen solar cells rather than forty considerably simplifies the problem of matching the output characteristics of cells in the assembly. Therefore, by the provision of sixteen solar cells and direct production of 80 pulses, the circuitry shown in FIG. 1 may be simplified by eliminating the final two stages, namely, the mixer 24 and the delay multivibrator 22. The position of the solar cells 34 relative to an advancing record card 38 is illustrated in FIGS. 5 and 5a. A suitable drive means may be used for propelling the sheet 38 in the arrow indicated path such as a motor driven drive roller 39 and idler roller 40. FIG. 5a illustrates the positioning of the source of illumination 8 which preferably may be a tungsten light. The source of illumination is fixed beyond the path of travel of the card 38 and casts a substantially constant and uniform illumination over the assembly of solar cells 34. It should be noted that the photo-sensitive elements 34 lie in a common plane as do the photo diodes 26 and 28 of FIG. 3 and the solar cells 34 of FIG. 4. The physical arrangement of the photo sensitive elements in each modification of FIGS. 3 and 4 is similar except that adjacent diodes or cells of a group are spaced apart a distance twice that illustrated by the manner of placement of the apertures 37 in FIG. 5 in which the mask apertures 37 are separated by a distance *d* which is equal to the spacing between columns of data indicia on the record card. Therefore, the number of distinct electrical pulses produced will conform to the number of columns on the record card.

While I have chosen certain specific embodiments of my invention for illustration, many modifications thereof are possible and will be apparent to those skilled in the art.

What is claimed is:

1. In a photo electric card reading system, means for deriving signals representative of the advancement of the card comprising two equal groups of alternately arranged photo diodes, each of said photo diodes being of approximately equal light sensitivity, a pair of input inductances each coupled to a different one of said groups of photo diodes and connectable to a source of D.C. potential, said input inductances being magnetically coupled in a balanced flux subtractive condition and serially connected at a common point, a source of substantially constant illumination directed at both of said groups of photo diodes, means for advancing the card whereby its leading edge alternately masks photo diodes in said two groups to effect an unbalanced flux condition in said input inductances, and means for deriving an output signal from either of said input inductances responsive to a flux unbalance condition therein.

2. In a photo electric card reading system, means for deriving signals representative of the advancement of the card comprising two equal groups of alternately arrayed photo diodes, each of said photo diodes being of approximately equal light sensitivity, a pair of input inductances, each coupled to a different one of said groups of photo diodes and connectable to a source of D.C. potential, said input inductances being magnetically coupled in a balanced flux subtractive condition, a source of substantially constant illumination directed at both of said groups of photo diodes, means for advancing the card between said source of illumination and said groups of photo diodes whereby its leading edge alternately masks photo diodes in said two groups to effect successive unbalanced flux conditions in said input inductances, and an output inductance magnetically coupled to both of said input inductances for deriving an output signal from either of said input inductances responsive to a flux unbalance condition therein.

3. In a photo electric card reading system, means for deriving signals representative of the advancement of the card comprising two equal and co-planar groups of alternately arrayed photo diodes, each of said photo diodes being of approximately equal light sensitivity, a pair of input inductance windings, each coupled to a different one of said groups of photo diodes and connectable to a source of D.C. potential, said input inductance windings being magnetically coupled in a balanced flux subtractive condition and having a common point, a source of substantially constant illumination directed at both of said groups of photo diodes, means for advancing the card between said source of illumination and said groups of photo diodes whereby its leading edge alternately masks photo diodes in said two groups to effect an unbalanced flux condition in said input inductance windings, and an output inductance winding magnetically coupled to both of said input inductance windings for deriving an output signal from either of said input inductance windings responsive to each successive flux unbalance condition therein.

4. In a photo electric card reading system, means for deriving signals representative of the advancement of the card comprising two equal, linear, and co-planar groups of alternately arrayed photo diodes, each of said diodes being of approximately equal light sensitivity, a pair of input inductances, each coupled in series with a different one of said groups of photo diodes and connectable to a source of D.C. potential, said input inductances being magnetically coupled in a balanced flux subtractive condition and having a common point, a source of substantially constant illumination directed at both of said groups of photo diodes, means for linearly advancing the card between said source of illumination and said groups of photo diodes whereby its leading edge alternately masks photo diodes in said two groups to effect an unbalanced flux condition in said input inductances, and means for deriving an output signal from either of said input inductances responsive to each successive flux unbalance condition therein.

5. In a photo electric card reading system, means for deriving signals representative of the advancement of the card comprising two equal and co-planar groups of alternately arranged photo diodes, each of said photo diodes being of approximately equal light sensitivity, all of said photo diodes in each of said groups similarly poled, a balanced transformer having an output inductance winding and a pair of input inductance windings, each of said input inductance windings being coupled to a different one of said groups of photo diodes and connectable to a source of D.C. potential, said input inductance windings being magnetically coupled in a balanced flux subtractive condition and having a common point, a source of substantially constant illumination directed at both of said groups of photo diodes, and means for advancing the card between said source of illumination and said groups of photo diodes whereby its leading edge alternately masks photo diodes in said two groups to effect successive unbalanced flux conditions in said input inductance windings, said output inductance winding being magnetically coupled to both of said input inductance windings for deriving an output signal from either of said input inductance windings responsive to a flux unbalance condition therein.

6. In a photo electric card reading system, means for deriving signals representative of the advancement of the card comprising two equal and co-planar groups of alternately arrayed photo diodes, each of said photo diodes being of approximately equal light sensitivity, all of said photo diodes in each of said groups similarly poled, a pair of input inductances, each coupled to a different one of said groups of photo diodes and connectable to a source of D.C. potential, said input inductances being magnetically coupled in a balanced flux subtractive condition and having a common point, a source of substantially constant illumination directed at both of said groups of photo diodes, means for advancing the card between said source of illumination and said groups of photo diodes whereby its leading edge alternatley masks photo diodes in said two groups to effect successive unbalanced flux conditions in said input inductances, and an output inductance magnetically coupled to both of said input inductances for deriving an output signal from either of said input inductances responsive to a flux unbalance condition therein.

7. In a photo electric card reading system, means for deriving signals representative of the advancement of the card comprising two equal and co-planar groups of alternately arrayed photo diodes, each of said photo diodes being of approximately equal light sensitivity, all of said photo diodes in each of said groups similarly poled, a pair of input inductances, each coupled to a different one of said groups of photo diodes and connectable to a source of D.C. potential, said input inductances being magnetically coupled in a balanced flux subtractive condition and having a common point, a source of substantially constant illumination directed at both of said groups of photo diodes, means for advancing the card between said source of illumination and said groups of photo diodes whereby its leading edge alternately masks photo diodes in said two groups to effect successive unbalanced flux conditions in said input inductances, an output inductance magnetically coupled to both of said input inductances for deriving an outpt signal resposive to a flux unbalance condition therein, a delay multivibrator connected to receive output signals from said output inductance, and a pulse mixer connected to receive output signals from said output inductance and delayed signals from said delay multivibrator.

8. In a photo electric card reading system, means for deriving signals representative of the advancement of the card comprising two equal and co-planar groups of alternately arrayed photo diodes, each of said photo diodes being of approximately equal light sensitivity, all of said photo diodes in each of said groups being similarly poled, a pair of input inductances, each coupled to a different one of said groups of photo diodes and connectable to a source of D.C. potential, said input inductances being magnetically coupled in a balanced flux subtractive condition and having a common point, a source of substantially constant illumination directed at both of said groups of photo diodes, means for advancing the card between said source of illumination and said groups of photo diodes whereby its leading edge alternately masks photo diodes in said two groups to effect successive unbalanced flux conditions in said input inductances, and an output inductance magnetically coupled to both of said input inductances for deriving an output signal responsive to a flux unbalance condition therein, said output inductance and each of said input inductances having the same number of windings.

9. In a photo electric card reading system, means for deriving signals representative of the advancement of the card comprising two equal and co-planar groups of alternately arrayed photo voltaic cells, each of said photo voltaic cells being of approximately equal light sensitivity, a pair of input inductances, each coupled across a different one of said groups of photo voltaic cells, said input inductances being magnetically coupled in a balanced flux subtractive condition and having a common point, a source of substantially constant illumination directed at both of said groups of photo voltaic cells, means for advancing the card between said source of illumination and said groups of photo voltaic cells whereby its leading edge alternately masks photo voltaic cells in said two groups to effect successive unbalanced flux condition in said input inductance, and an output inductance magnetically coupled to both of said input inductances for deriving an output signal responsive to a flux unbalance condition therein.

10. A photo electric assembly for producing a signal responsive to the advancement of the leading edge of a record card comprising a photo voltaic cell having a light sensitive surface and a substantially constant current output, masking means mounted on said light sensitive surface and having a plurality of like apertures spaced in the path of travel of the card, a source of substantially constant illumination directed at said photo voltaic cell, means for advancing the card between said source of illumination and said photo voltaic cell to cover successive apertures in said masking means and effect current changes in the output of said photo voltaic cell, and balanced transformer inductive coupling means connected to said photo voltaic cell for producing an output signal responsive to each of the current changes therein.

11. A photo electric assembly for producing signals responsive to the advancement of the leading edge of a record card comprising a photo voltaic cell having a light sensitive surface and a substantially constant current output, masking means mounted on said light sensitive surface and having a plurality of like apertures uniformly spaced in the path of travel of the card, a source of substantially constant illumination directed at said photo voltaic cell, means for advancing the card between said source of illumination and said photo voltaic cell to cover successive apertures in said masking means and thereby effect changes in the current output of said photo voltaic cell, and means including an output inductance magnetically coupled to said photo voltaic cell operable to produce an output signal responsive to each of the current changes in said photo voltaic cell.

12. A photo electric assembly for producing signals responsive to the advancement of the leading edge of a record card having a plurality of equally spaced columns of data indicia comprising a photo voltaic cell having a light sensitive surface and a substantially constant current output, masking means mounted on said light sensitive surface and having a plurality of like apertures spaced according to the column spacing on the record card, a source of substantially constant illumination directed at said photo voltaic cell, means for advancing the card between said source of illumination and said photo voltaic cell to cover successive apertures in said masking means and effect current changes, and means including an output inductance coupled to said photo voltaic cell for producing an output signal responsive to each of the current changes therein.

13. In a photoelectric card reader for deriving timing signals from an advancing card containing information encoded thereon in a plurality of spaced columns extending transversely to the direction of advancement of the card, a source of illumination on one side of the path of advancement of the card, two equal groups of alternately arrayed and equally spaced light responsive devices located on the other side of the path of the advancing card for successive interception thereby and generation of a first train of equally spaced pulses, a transformer having a pair of balanced input windings connected in flux subtractive relation and an output winding with each of the input windings connected to a different one of said groups of light responsive devices, pulse delay means connected to receive and delay said first train of pulses, and pulse mixer means having an input terminal connected to receive said first train of pulses, another input terminal connected to receive the delayed train of pulses and an output terminal at which said first train of pulses and said delayed train of pulses appear as an interspersed series of evenly spaced pulses.

14. A photoelectric assembly for producing signals responsive to the advancement of the leading edge of a record card comprising a substantially constant current output photo voltaic cell having a light sensitive surface, masking means on said light sensitive surface and having a plurality of like apertures uniformly spaced in the path of travel of the card, a source of substantially constant illumination directed at said photo voltaic cell, means for advancing the card between said source of illumination and said photo voltaic cell to cover successive apertures in said masking means and thereby effect changes in the current output of said photo voltaic cell, an output inductance magnetically coupled to said photo voltaic cell operable to produce an output signal responsive to each of the current changes in said photo voltaic cell, a delay multivibrator connected to receive output signals from said output inductance, and a pulse mixer connected to receive output signals from said output inductance and delayed signals from said delay multivibrator.

References Cited in the file of this patent

UNITED STATES PATENTS

| | | |
|---|---|---|
| 2,630,043 | Kolisch | Mar. 3, 1953 |
| 2,677,815 | Brustman | May 4, 1954 |
| 2,910,684 | Jones | Oct. 27, 1959 |
| 2,931,916 | Sinn | Apr. 5, 1960 |
| 2,941,086 | Gottschall et al. | June 14, 1960 |